(No Model.)  P. F. & C. A. FLEMING.  2 Sheets—Sheet 1.
HORSE HAY RAKE.
No. 526,807.  Patented Oct. 2, 1894.
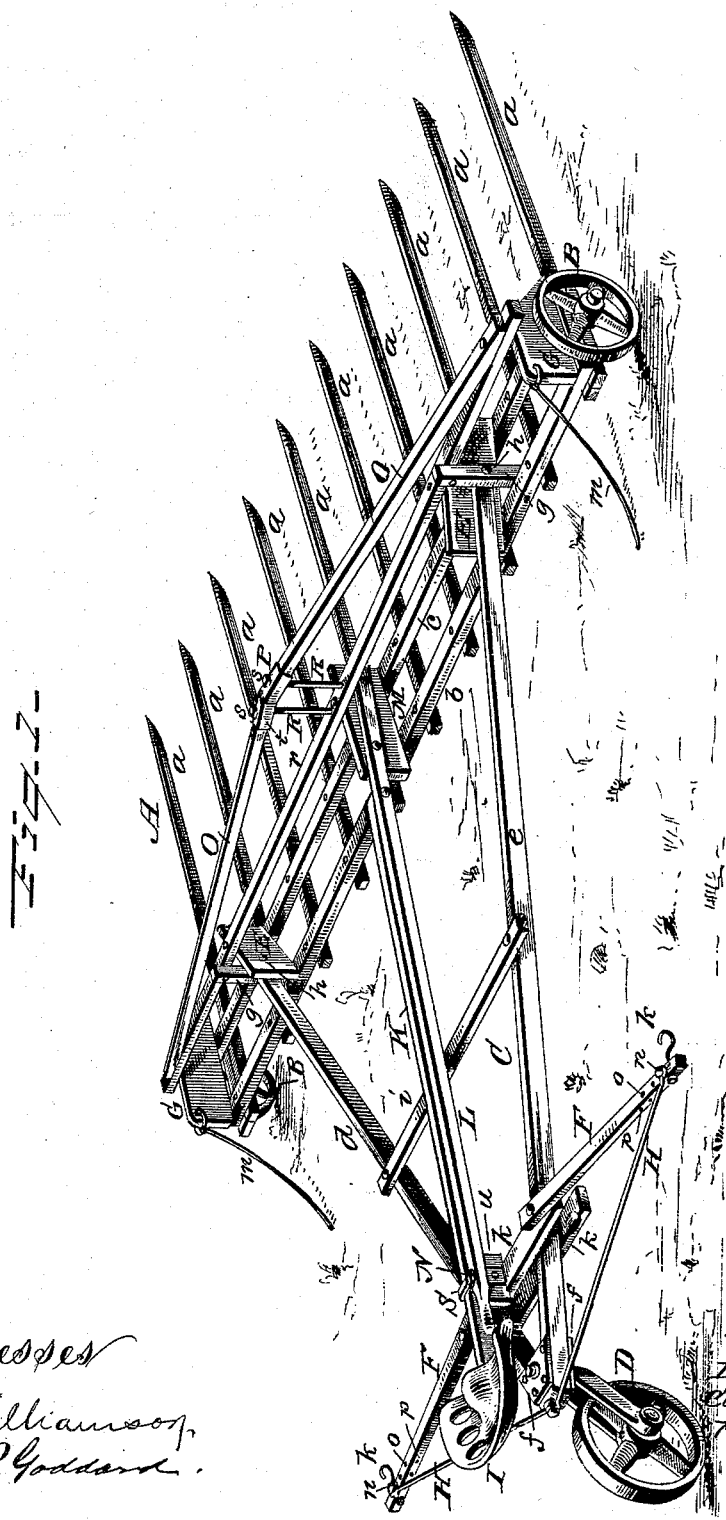
Witnesses
C. J. Williamson
Geo. B. Goddard
Inventors
Peter F. Fleming
Clifford A. Fleming
per Chas. H. Fowler
Attorney (No Model.)  2 Sheets—Sheet 2.
P. F. & C. A. FLEMING.
HORSE HAY RAKE.
No. 526,807.  Patented Oct. 2, 1894.
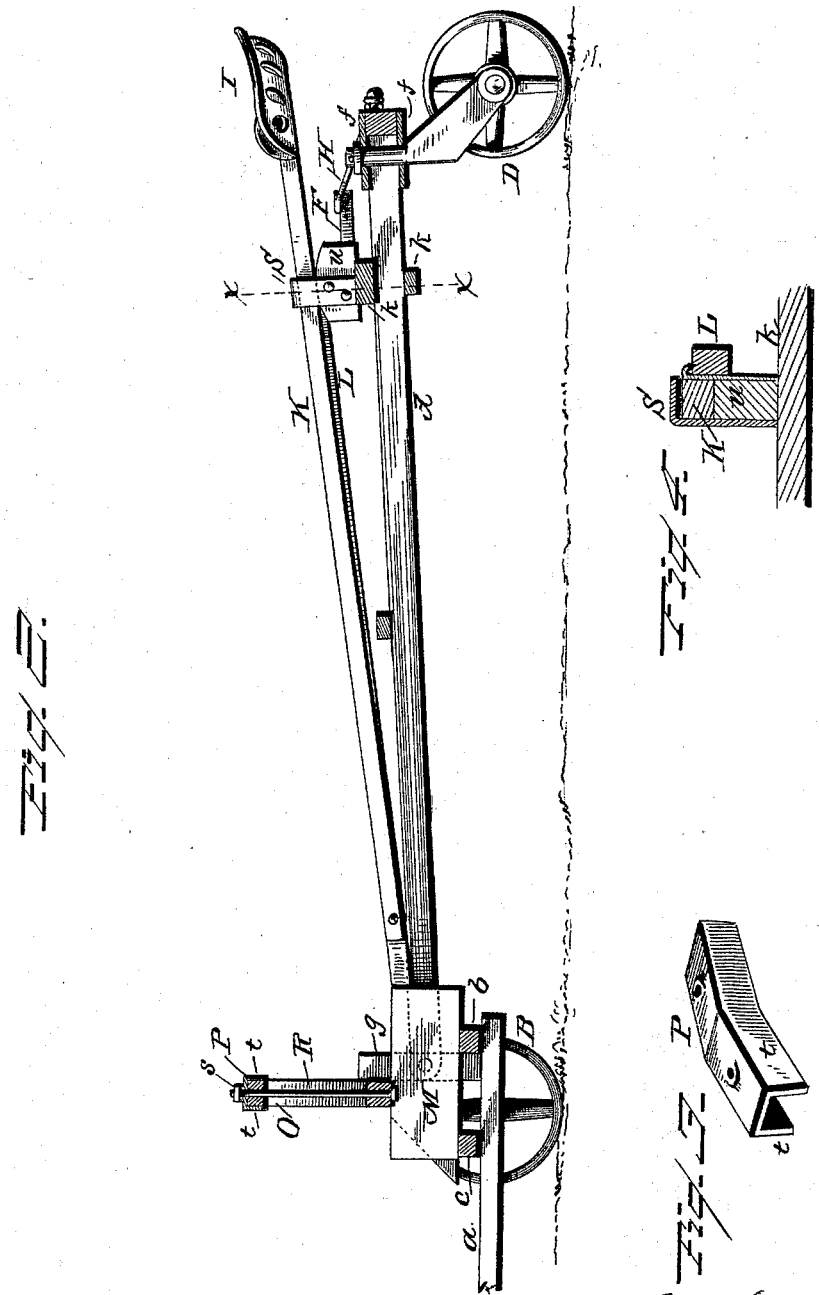
Witnesses
J. J. Williamson.
Geo. B. Goddard.
Inventors
Peter F. Fleming.
Clifford A. Fleming.
per Chas. H. Fowler.
Attorney.

UNITED STATES PATENT OFFICE.

PETER F. FLEMING AND CLIFFORD A. FLEMING, OF HUNTSVILLE, MISSOURI.

HORSE HAY-RAKE.

SPECIFICATION forming part of Letters Patent No. 526,807, dated October 2, 1894.

Application filed March 10, 1894. Serial No. 503,116. (No model.)

*To all whom it may concern:*

Be it known that we, PETER F. FLEMING and CLIFFORD A. FLEMING, citizens of the United States, residing at Huntsville, in the county of Randolph and State of Missouri, have invented certain new and useful Improvements in Horse Hay-Rakes; and we do hereby declare that the following is a full, clear, and exact description of the same, reference being had to the annexed drawings, making a part of this specification, and to the letters of reference marked thereon.

The present invention has relation to that class of horse hay rakes in which the team is connected in the rear of the rake, and the purpose of the invention is to improve the rake in the several details of construction whereby the same will be rendered practical in its operation and readily controlled by the driver as well as simple in its parts and durable in construction.

The invention consists in a horse hay rake constructed substantially as shown in the drawings and hereinafter described and claimed.

Figure 1 of the drawings represents a perspective view of a hay rake constructed in accordance with our invention; Fig. 2, a longitudinal section thereof; Fig. 3, a detail view in perspective and on an enlarged scale of the brace-plate; Fig. 4, a detail view in perspective taken on line $x$ $x$ of Fig. 2.

In the accompanying drawings A represents the rake proper which may be of the usual construction, consisting of the teeth $a$ connected to the transverse beams $b$ $c$ and supported by the wheels B. The riding attachment which is connected to the rake proper above described, consists of the V-shaped frame C composed of the beams $d$ $e$ connected together at their rear ends by metal plates $f$ to which is connected the trail-wheel D. The forward ends of the beams $d$ $e$ have pivotally connected thereto the rake A, the ends of said beams extending between short standards $g$ connected to the transverse beam $b$ and the guards E. A pivot-bolt $h$ passes through the standard, end of the beam, and the guards, said guards preventing lateral strain upon the ends of the beams and pivot-bolts when the rake is being operated. A transverse brace $i$ and braces $k$ are connected to the beams $d$ $e$, and to the upper one of the latter mentioned braces are pivotally connected suitable double-trees F provided with hooks $k$ or other suitable means for attaching thereto the horses for carrying the rake. Ropes $m$ are attached to corner blocks G in front of the horses and are also suitably connected to the breast-straps of the harness, so that when the horses are backed the draft will be upon the rake A to enable it to be moved in an opposite direction.

The double-trees F are rendered adjustable to accommodate them to different size horses in order to allow them to work behind the rake.

The double-trees F have adjustably connected to them one end of stay-rods H by means of the pins $n$ and holes $o$, and the hooks $k$ are also capable of having their position changed with relation to the ends of the double-trees by engaging the hooks with one of the series of holes $p$ therein. Previous to this adjustment the ends of the stay-rods are disconnected with the double-trees and said double-trees brought to the desired angle with relation to the V-shaped frame necessary to accommodate the horses to be attached thereto, after which the stay-rods are secured to the double-trees by means of the pins hereinbefore described, thus holding them firmly in their adjusted position.

The driver's seat I is connected to the rear end of a central beam K, said beam at its forward end being pivotally connected with a hand-lever L.

The hand-lever L is rigidly attached to a central brace M and when the lever is in the position shown in Fig. 1, the rake-teeth $a$ are held in an elevated position off the ground. By means of the lever the rake teeth can be controlled by the driver upon his seat, and when it is desired to raise the teeth from off the ground, the lever is depressed and engaged with the keeper N so that the teeth will be retained in an elevated position. Angle braces O are connected at their outer ends to a transverse beam $r$ and at their inner ends are connected together by a brace plate or metal cap P. Adjusting rods R extend through the metal cap P and down through the ends of the braces O and beam $r$. These rods are screw threaded at their ends and provided with adjusting nuts s, thus enabling the angle-braces O to be tightened by the adjustment of the nuts and thereby keeping the rake A from sagging down at or near its center, any sagging being taken up by the adjustment of the angle braces.

The metal cap P has side flanges t and has a double incline to adapt itself to the inclination of the ends of the angle braces O, the flanges upon the metal cap fitting down over the sides of the braces and preventing any lateral strain on the adjusting rods R.

The angle braces O and means of adjusting them are of material importance when the rake is carrying a heavy load.

The central beam K to which the seat I is connected, is held loosely in position by a metal bracket S secured to a block u so that it will give ease and comfort to the driver upon the seat.

Having now fully described our invention, what we claim as new, and desire to secure by Letters Patent, is—

The rake A and frame C pivotally connected together, the pivoted and adjustable double-trees F, the adjustable stay-rods H, and the adjustable hooks k, substantially as and for the purpose specified.

In testimony that we claim the above we have hereunto subscribed our names in the presence of two witnesses.

PETER F. FLEMING.
CLIFFORD A. FLEMING.

Witnesses:
F. E. SHELDON,
C. B. SHAEFER.